US009134474B2

United States Patent
Lindsay et al.

(10) Patent No.: US 9,134,474 B2
(45) Date of Patent: Sep. 15, 2015

(54) HEADLAMP BULB TYPE LIGHT PIPE

(75) Inventors: Brian Leonard Lindsay, Ann Arbor, MI (US); Yasuo Watanabe, Battle Creek, MI (US)

(73) Assignees: Toyota Motor Engineering & Manufacturing North America, Inc., Erlanger, KY (US); II Stanley Co., Inc., Battle Creek, MI (US)

( * ) Notice: Subject to any disclaimer, the term of this patent is extended or adjusted under 35 U.S.C. 154(b) by 304 days.

(21) Appl. No.: 12/724,554

(22) Filed: Mar. 16, 2010

(65) Prior Publication Data

US 2011/0228549 A1 Sep. 22, 2011

(51) Int. Cl.
*F21V 9/00* (2015.01)
*F21V 8/00* (2006.01)
*F21S 8/10* (2006.01)

(52) U.S. Cl.
CPC ............. *G02B 6/002* (2013.01); *F21S 48/1208* (2013.01); *F21S 48/1241* (2013.01); *F21S 48/2206* (2013.01); *F21S 48/2225* (2013.01); *G02B 6/0006* (2013.01); *G02B 6/0073* (2013.01)

(58) Field of Classification Search
CPC .......................... F21S 28/1208; F21S 48/1241
USPC ......... 362/511, 555, 551, 518, 507, 509, 516, 362/545
See application file for complete search history.

(56) References Cited

U.S. PATENT DOCUMENTS

| | | | |
|---|---|---|---|
| 5,365,412 A | | 11/1994 | Koppolu et al. |
| 5,711,592 A | * | 1/1998 | Hotta ............................ 362/496 |
| 5,984,497 A | * | 11/1999 | Foerstner et al. .............. 362/511 |
| 6,099,156 A | * | 8/2000 | Jenkins et al. ................. 362/511 |
| 6,164,799 A | * | 12/2000 | Hirmer et al. ................. 362/330 |
| 6,547,428 B1 | * | 4/2003 | Delattre ........................ 362/511 |
| 7,086,765 B2 | * | 8/2006 | Wehner ......................... 362/511 |
| 7,377,675 B2 | * | 5/2008 | Pastrick et al. ............... 362/494 |
| 7,946,743 B2 | * | 5/2011 | Natsume et al. .............. 362/516 |
| 8,057,081 B2 | * | 11/2011 | Schwab ........................ 362/511 |

(Continued)

FOREIGN PATENT DOCUMENTS

| | | |
|---|---|---|
| JP | 05-164923 A | 6/1993 |
| JP | 2000-137152 A | 5/2000 |

*Primary Examiner* — Anh Mai
*Assistant Examiner* — Jessica M Apenteng
(74) *Attorney, Agent, or Firm* — Gifford, Krass, Sprinkle, Anderson & Citkowski, P.C.

(57) ABSTRACT

The present invention provides an automotive headlamp assembly having a light pipe. The present invention provides use of at least one incandescent light bulb to illuminate the light pipe. Power consumption is reduced from approximately 35 watts to 10 watts. The present assembly consists of a light pipe, at least one light source positioned at either end of the light pipe, the light source being an incandescent light bulb, at least one reflector and an elongated reflector positioned adjacent the light pipe. The reflector is positioned adjacent the light source to capture light from the light bulb, concentrate the light into a beam and reflect the light into the light pipe. The reflector aims light directly down the light pipe without the use of cable or LED mounted to the light pipe. The reflector prevents lost light and creates a more efficient headlamp assembly. The light pipe is a generally cylindrical elongated member having a plurality of attachment members. Light pipe and attachment members are molded as a one piece construction. Furthermore, an elongated reflector is positioned adjacent the light pipe thereby preventing lost light and creating the illusion of a brighter light pipe.

18 Claims, 2 Drawing Sheets

(56) References Cited

U.S. PATENT DOCUMENTS

| | | | |
|---|---|---|---|
| 8,070,341 B2 * | 12/2011 | Chinniah et al. | 362/551 |
| 2005/0189545 A1 * | 9/2005 | Tazawa et al. | 257/79 |
| 2006/0067084 A1 * | 3/2006 | Stefanov | 362/511 |
| 2009/0225530 A1 | 9/2009 | Naijo et al. | |
| 2010/0254152 A1 * | 10/2010 | Taleb-Bendiab et al. | 362/551 |

\* cited by examiner

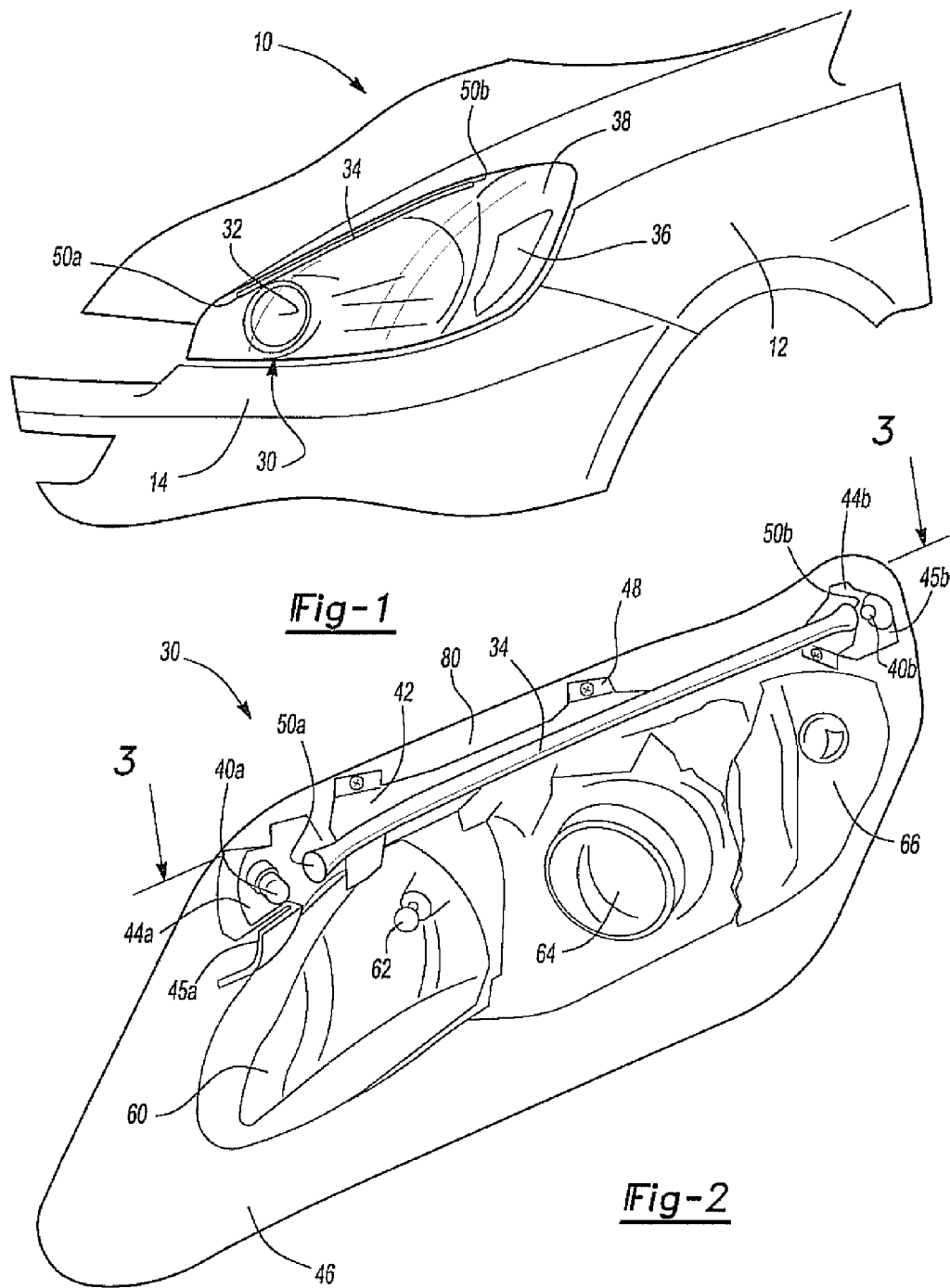

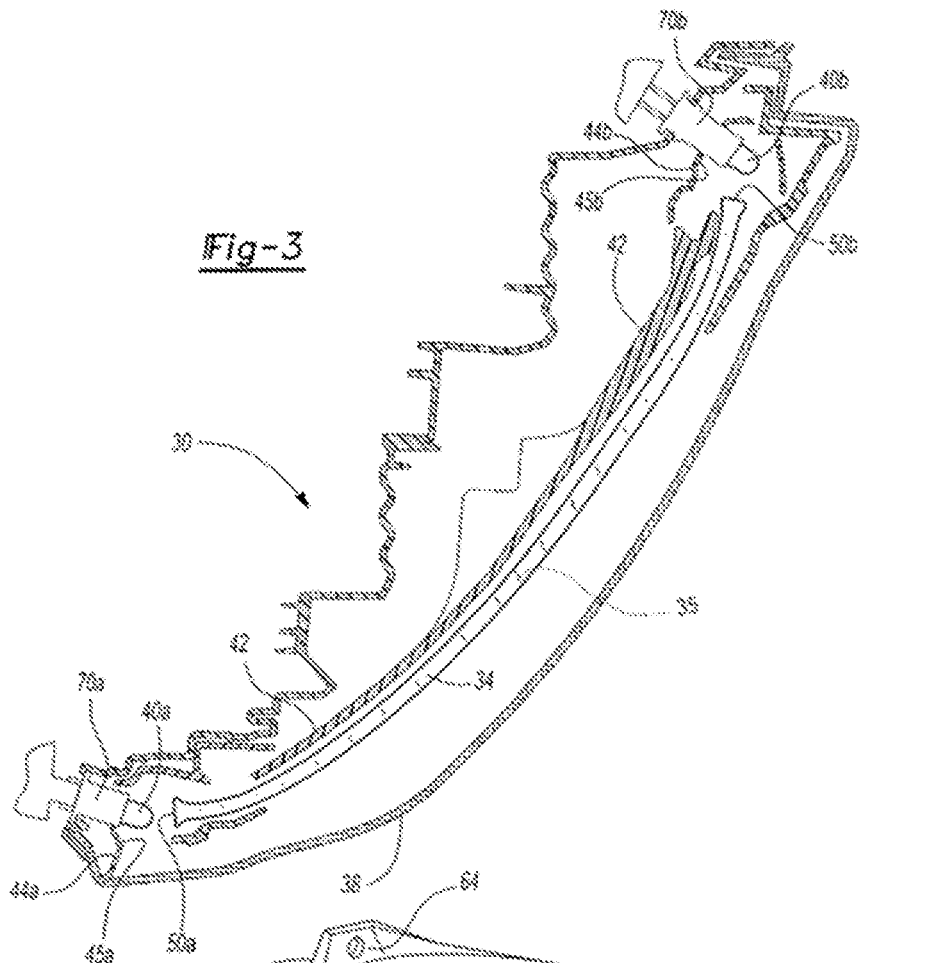

HEADLAMP BULB TYPE LIGHT PIPE

FIELD OF THE INVENTION

The present invention relates to vehicle lighting assemblies and, in particular, vehicle headlamp assemblies having a light pipe.

BACKGROUND OF THE INVENTION

Current light pipe designs use either LED (light emitting diode) or halogen bulbs with a fiber optic cable. LED light pipe configurations are most frequently in headlamps containing a light pipe. LED lights create a bright and clear light, however, the cost of LED lights is very high. Oftentimes, numerous LED lights are required to operate a light pipe in an automotive headlamp and are expensive to manufacture. Expensive production costs lead to the elimination of the highly desirable light pipe in vehicle headlamp assemblies. Furthermore, halogen bulbs with fiber optic cables are also frequently used to illuminate a light pipe subassembly. Halogen bulbs with fiber optic cables are assembled having a halogen bulb with a fiber optic cable routed to the light pipe. However, halogen bulbs with fiber optic cables are expensive to produce and therefore not desirable to incorporate within an automotive headlamp. Additionally, halogen bulbs with fiber optic cables used to illuminate a light pipe consume high amounts of power, thereby increasing vehicle operation costs for the operator of the vehicle. Accordingly, it would be particularly advantageous to design a reduced cost and decreased power consumption headlamp assembly while still incorporating a light pipe.

SUMMARY OF THE INVENTION

The present invention provides an automotive headlamp assembly having a light pipe. The present invention provides use of at least one incandescent light bulb to illuminate the light pipe. Current light pipe designs use either LED or halogen bulbs with a fiber optic cable. Power consumption is reduced from approximately 35 watts in one bulb to 10 watts by using two incandescent light bulbs to illuminate the light pipe. The present assembly consists of a light pipe, at least one light source positioned at either end of the light pipe, the light source being an incandescent light bulb, at least one reflector and an elongated reflector positioned adjacent the light pipe. The reflector is positioned adjacent the light source to capture light from the light source, concentrate the light into a beam and reflect the light into the light pipe. The reflector aims light directly down the light pipe without the use of cable or an LED mounted to the light pipe. The reflector prevents lost light and creates a more efficient headlamp assembly. The light pipe is a generally cylindrical elongated member having a plurality of attachment members. Light pipe and attachment members are molded as a one piece construction. Furthermore, the elongated reflector is positioned adjacent the light pipe thereby preventing lost light and creating the illusion of a brighter light pipe.

BRIEF DESCRIPTION OF THE DRAWINGS

FIG. 1 is a perspective view of an automotive headlamp assembly installed on a motor vehicle;

FIG. 2 is a perspective view of the headlamp assembly with removed outer lens;

FIG. 3 is a cross section depiction of the headlamp assembly; and

FIG. 4 is a close up perspective view of the incandescent light bulb and reflector.

DETAILED DESCRIPTION OF THE INVENTION

The present invention provides an automotive headlamp assembly having a light pipe. The present assembly consists of a light pipe, at least one light bulb, at least one reflector, and an elongated reflector positioned adjacent the light pipe. The reflector is generally positioned adjacent the light bulb to capture light from the light bulb, concentrate light into a beam, and reflect the light into the light pipe. The reflector aims light directly down the light pipe without the use of a cable or LED light source mounted to the light pipe. The reflector and optional elongated reflector prevent lost light and create a more efficient headlamp assembly.

FIG. 1 is a perspective view of an automotive headlamp assembly 30 installed on a motor vehicle 10. This perspective view shows the front driver's side of a motor vehicle 10 depicting a headlamp assembly 30. The motor vehicle 10 includes a side panel 12 and a front bumper 14. In this embodiment the headlamp assembly 30 further includes a headlight 32. The headlamp assembly 30 further includes a lens 38. Lens 38 is transparent and colorless and wraps around the vehicle 10 to extend from the front bumper 14 to the side panel 12. The headlamp assembly 30 further includes a reflex reflector 36. Reflex reflector 36 is further connected to lens 38 which wraps around the vehicle 10 extending from the front bumper 14 to the side panel 12.

The headlamp assembly 30 of the motor vehicle 10 further includes a light pipe 34 within the headlamp assembly 30. Light pipe 34 is intended to illuminate the vehicle 10 while simultaneously providing a unique, in high demand feature for motor vehicle headlights. The light pipe 34 is comprised of an acrylic or polymeric material. The light pipe 34 is an solid elongated cylindrical member including a first end 50a and a second end 50b. In this embodiment, the light pipe 34 is straight. In other embodiments the light pipe 34 may optionally be curved. The interior of the light pipe 34 includes a plurality of facets 35 designed to uniformly distribute light within the light pipe 34. Each facet 35 of light pipe 34 includes a facet surface area 37. Light is reflected off of the facet surface area 37. The facet surface area 37 of each facet 35 within the light pipe 34 varies in size along the length of the light pipe 34. The facet surface area 37 of each facet 35 is small at the first end 50a of the light pipe 34. The facet surface area of each facet is also small at the second end 50b. Less light is reflected off the facet surface area at the first end 50a and at the second end 50b. The facet surface areas 37 of the facets 35 toward the middle of the light pipe 34 have larger facet surface areas 37 as to reflect more light. The distribution of smaller and larger facet surface provides for an equal distribution of light throughout the light pipe 34.

FIG. 2 is a perspective view of the headlamp assembly 30 with removed outer lens 38. The headlamp assembly 30 housing 46 includes a plurality of light emitting devices. Light bulb 62 is provided housed in reflector 60 thereby providing the main source of light to the motor vehicle 10. Furthermore, headlamp 64 and light source 66 are also provided mounted within the housing 46.

The present headlamp assembly consists of a light pipe 34, two light sources 40a, 40b, two reflectors 44a, 44b, and an elongated reflector 42. Light sources 40a, 40b are incandescent light bulbs. Reflectors 44a, 44b each have a first surface 45a, 45b. First surface 45a, 45b may be curved to better direct light from the light sources 40a, 40b. The first surfaces 45a, 45b of the reflectors 44a, 44b further include a highly reflective surface. Different curvatures of the first surfaces 45a, 45b provide for different reflections of light. The curvature of the first surfaces 45a, 45b may be modified to direct more or less light into the light pipe 34 at the first end 50a (or the second end 50b).

The highly reflective surface appearance of the first surfaces 45a, 45b of the reflectors 44a, 44b may have a shiny or metallic surface. The reflectors 44a, 44b may be comprised of a metal, acrylic, or polymeric material. The reflectors 44a, 44b are configured to concentrate the light into the first end 50a (and second end 50b) and direct the light into the light pipe 34. The light pipe 34 extends between the reflectors 44a, 44b and the light sources 40a, 40b. The reflectors 44a, 44b prevent lost light and create a more efficient headlamp assembly and light pipe 34 by efficiently concentrating light and directing that light into the light pipe 34.

The elongated reflector 80 is positioned adjacent light pipe 34. Reflector 80 includes a shiny or reflective surface. The elongated reflector 80 prevents lost light from the light pipe 34 thereby creating a brighter appearance of the headlamp assembly 30. The elongated reflector 80 may be comprised of an acrylic, polymeric, or metallic material.

Light pipe 34 may further comprise an attachment member 48. Attachment member 48 is adapted to connect the light pipe 34 to the housing 46. The combination and specified placement of the light pipe 34, elongated reflector 80, light source 40a, 40b and reflectors 44a, 44b contribute to a headlamp assembly 30 which provides a light pipe 34 while simultaneously reducing power from approximately 35 watts to 10 watts.

Power consumption is greatly reduced in the headlamp assembly 30 by use of an incandescent bulb as the light source 40a, 40b. In the present embodiment, two light sources 40a, 40b utilize two incandescent light bulbs, thereby reducing power consumption and cost. Furthermore, halogen light bulbs with fiber optic cables are also frequently used to illuminate a light pipe. Halogen bulbs with fiber optic cables are assembled having a halogen bulb with a fiber optic cable routed to the light pipe. However, halogen light bulbs with fiber optic cables are expensive to produce and therefore not desirable to incorporate within an automotive headlamp. Therefore, the use of two light sources 40a, 40b utilizing incandescent light bulbs provides a reduced cost and decreased power consumption from approximately 35 watts to 10 watts while still retaining the highly desirable light pipe 34 feature.

FIG. 3 is a cross section depiction of the headlamp assembly 30. The headlamp assembly 30 consists of a light pipe 34, two light sources 40a, 40b, two connectors 70a, 70b and two reflectors 44a, 44b. Light sources 40a, 40b are incandescent light bulbs. Reflectors 44a, 44b each have a first surface 45a, 45b. First surface 45a, 45b may be curved to better direct light from the light sources 40a, 40b. The first surfaces 45a, 45b of the reflectors 44a, 44b further include a highly reflective surface. The highly reflective surface appearance of the first surfaces 45a, 45b of the reflectors 44a, 44b may have a shiny or metallic surface. The reflectors 44a, 44b may be comprised of a metal, acrylic, or polymeric material. The reflectors 44a, 44b are configured to concentrate the light into the opening and reflect the light into the light pipe 34. The light pipe 34 extends between the reflectors 44a, 44b and the light sources 40a, 40b. The reflectors 44a, 44b prevent lost light and create a more efficient headlamp assembly and light pipe 34.

FIG. 4 is a close up perspective view of the incandescent light bulb and reflector subassembly. The subassembly consists of a light pipe 34, light source 40a, and reflector 44a. Light source 40a is an incandescent light bulb. Reflector 44a has a first surface 45a. First surface 45a may be curved to better direct light from the light source 40a. The light source 40a is mounted via connector 70a.

The housing 46 is comprised of a plastic or polymeric material. Housing 46 is further mounted to the motor vehicle 10. The housing 46 may be mounted to the motor vehicle 10 by means of a connector 64. A screw, or other fastening means, may be used to connect the housing to the motor vehicle 10.

The first surface 45a of the reflector 44b is highly reflective. The highly reflective surface appearance of the first surface 45b of the reflector 44a may have a shiny or metallic surface. The reflector 44a may be comprised of a metal, acrylic, or polymeric material. The reflector 44a is configured to concentrate the light into the opening and reflect the light into the light pipe 34. The reflector 44a prevents lost light and creates a more efficient headlamp assembly 30 and light pipe 34. The reflector 44a is provided mounted within the housing 46. The reflector 44a further includes secondary surfaces 52, 54 further defining the curve of the reflector 44a. Secondary surfaces 52, 54 of reflector 44a are depicted generally planar. Secondary surfaces 52, 54 may optionally be curved to better reflect light into the light pipe 34. The reflector 44a additionally has a back side 66a having an extension 68a. It should be noted that an equivalent reflector subassembly is also provided on the opposite end of light pipe 34 incorporating reflector 44a and light source 40a.

Light arrows 70 emitting from the light source 40a are incorporated to depict the travel direction of light emitting from the light source 40a into the first end 50a of the light pipe 34. Light from light source 40a reflects off of the surfaces of the reflector 44a, 45a and into the first end 50a of the light pipe 34.

Light pipe 34 has a generally bell shaped first end 50a providing a larger surface area allowing for more light to enter the light pipe 34. The light pipe 34 is attached to the housing 46 by means of attachment 61. In this embodiment, the attachment 61 includes an extended attachment member 72. Additionally, the light pipe has an attachment member 56 adapted to mount the light pipe 34 to the housing 46. In this embodiment, the attachment 60, attachment member 56 and light pipe 34 is molded as a one piece construction. The headlamp assembly 30 may optionally include an elongated reflector 80 positioned adjacent the light pipe 34 and extending the length of the light pipe 34.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

We claim:

1. An automotive headlamp assembly comprising:
at least one light source, the light source being an incandescent light bulb;
at least one reflector positioned adjacent the light source, the at least one reflector positioned behind the light source and extending adjacent to an elongated light pipe;
the elongated light pipe having a first end, the elongated light pipe extending away from the at least one light source, the first end of the light pipe spaced apart and separate from the at least one light source, the first end having a bell shaped structure, the larger portion of the bell opening towards the light source, the bell shaped structure providing for a larger surface area allowing for more light to enter the elongated light pipe;

the elongated light pipe being generally cylindrical having an outer surface, the first end configured to receive light, a portion of the outer surface of the light pipe being entirely smooth, the at least one reflector being curved to direct and reflect light into each of the first end of the light pipe, the reflector spaced apart from the first end; and the elongated pipe having a plurality of facets spaced apart one from another along an interior portion of the light pipe, the facets each having a surface area, the surface areas of the facets progressively varying in size wherein the facets spaced farther apart from the light source have a larger surface area as compared to the surface areas of the facets closer to the light source, the facets disposed within the light pipe, the facets directing light outwardly from the light pipe to the exterior of a vehicle to illuminate the vehicle.

2. The automotive headlamp assembly of claim 1, wherein said elongated light pipe is a solid elongated generally cylindrical member.

3. The automotive headlamp assembly of claim 1, wherein said elongated light pipe is a hollow elongated tube.

4. The automotive headlamp assembly of claim 1, wherein said reflector further comprises a reflector surface.

5. The automotive headlamp assembly of claim 4, wherein said reflector surface of said reflector is curved to direct light from said light source into said first end of said elongated light pipe.

6. The automotive headlamp assembly of claim 4, wherein said reflector surface is polished to create a highly reflective surface.

7. The automotive headlamp assembly of claim 4, wherein said reflector surface is metalized.

8. The automotive headlamp assembly of claim 1, wherein said automotive headlamp assembly includes two of said light sources.

9. The automotive headlamp assembly of claim 8, wherein said automotive headlamp assembly includes two of said reflectors.

10. The automotive headlamp assembly of claim 9, wherein said elongated light pipe includes a second end, said second end configured to accept light from a second said light source.

11. The automotive headlamp assembly of claim 10, wherein said elongated light pipe extends between said two of said light sources.

12. The automotive headlamp assembly of claim 1 further having an elongated reflector positioned adjacent said elongated light pipe.

13. The automotive headlamp assembly of claim 12, wherein said elongated reflector extends the length of said elongated light pipe.

14. The automotive headlamp assembly of claim 1, wherein said light pipe further includes at least one extended attachment member molded with the light pipe.

15. The automotive headlamp assembly of claim 14, wherein said extended connection members and said light pipe are a one piece construction.

16. The automotive headlamp assembly of claim 1, wherein the first end configured to simultaneously receive light directly from the light source and indirectly from the reflector.

17. The automotive headlamp assembly of claim 1, wherein the reflector is positioned behind the light source to direct lost light from the light source into the light pipe.

18. The automotive headlamp assembly of claim 1, wherein the light source is connected to the reflector.

* * * * *